(12) United States Patent
Shimizu et al.

(10) Patent No.: US 9,498,899 B2
(45) Date of Patent: Nov. 22, 2016

(54) SCREW PAIR AND CO-ROTATING INTERMESHING TWIN-SCREW EXTRUDER PROVIDED WITH SCREW PAIR

(71) Applicant: THE JAPAN STEEL WORKS, LTD., Tokyo (JP)

(72) Inventors: Yohei Shimizu, Hiroshima (JP); Kiyoshi Handa, Hiroshima (JP); Jun Kakizaki, Hiroshima (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 196 days.

(21) Appl. No.: 14/382,247

(22) PCT Filed: Feb. 28, 2013

(86) PCT No.: PCT/JP2013/055520
§ 371 (c)(1),
(2) Date: Aug. 29, 2014

(87) PCT Pub. No.: WO2013/129608
PCT Pub. Date: Jun. 9, 2013

(65) Prior Publication Data
US 2015/0029812 A1    Jan. 29, 2015

(30) Foreign Application Priority Data
Mar. 1, 2012   (JP) ................... 2012-045573

(51) Int. Cl.
*B29B 7/84* (2006.01)
*B29B 7/48* (2006.01)
(Continued)

(52) U.S. Cl.
CPC ............. *B29B 7/842* (2013.01); *B29B 7/48* (2013.01); *B29B 7/482* (2013.01); *B29B 7/489* (2013.01);
(Continued)

(58) Field of Classification Search
CPC ............. B29B 7/842; B29B 7/482; B29B 7/48; B29B 7/489; B29C 47/6031; B29C
(Continued)

(56) References Cited

U.S. PATENT DOCUMENTS 4,900,156 A * 2/1990 Bauer ................ B29C 47/6093
366/322
5,458,475 A * 10/1995 Suumen ................ B29C 45/60
264/349
(Continued)

FOREIGN PATENT DOCUMENTS

CN      201079735 Y    7/2008
CN      102227300 A    10/2011
(Continued)

OTHER PUBLICATIONS

Machine translation of JP2001322154, accessed via http://worldwide.espacenet.com/ on May 4, 2016.*
(Continued)

*Primary Examiner* — Charles Cooley
*Assistant Examiner* — Marc C Howell
(74) *Attorney, Agent, or Firm* — Sughrue Mion, PLLC

(57) ABSTRACT

A screw pair includes first and second screws having an outer circumferential surface on which a groove is spirally formed, and transports a raw material in a first direction along each of axis centers. An inner surface of the groove of each of the screws includes a first surface, which faces in the first direction, and in which the outer circumferential surfaces of the screws are formed to coincide with each other without a gap therebetween in the state where the screws mesh with each other, and a second surface, which faces in a second direction opposite to the first direction, and which
(Continued)

forms a gap between the outer circumferential surfaces of the screws in the state where the screws mesh with each other.

8 Claims, 10 Drawing Sheets

(51) Int. Cl.
*B29C 47/76* (2006.01)
*B29C 47/00* (2006.01)
*B29C 47/08* (2006.01)
*B29C 47/40* (2006.01)

(52) U.S. Cl.
CPC .............. *B29B 7/84* (2013.01); *B29C 47/767* (2013.01); *B29B 7/845* (2013.01); *B29C 47/0009* (2013.01); *B29C 47/0871* (2013.01); *B29C 47/402* (2013.01); *B29K 2901/12* (2013.01)

(58) Field of Classification Search
CPC ............ 47/6056;B29C 47/6075; B29C 47/767
USPC ........................................................ 366/85
See application file for complete search history.

(56) References Cited

U.S. PATENT DOCUMENTS

| | | | |
|---|---|---|---|
| 6,220,745 | B1 | 4/2001 | Kobayashi et al. |
| 7,080,935 | B2* | 7/2006 | Innerebner ............. B29C 47/42 366/85 |
| 8,876,360 | B2* | 11/2014 | Bierdel ............... B29C 47/0854 366/82 |
| 2003/0137894 | A1* | 7/2003 | Reisenhofer ............ B29C 47/38 366/85 |
| 2005/0041521 | A1* | 2/2005 | Herter ................. B29C 47/6056 366/82 |
| 2009/0175120 | A1* | 7/2009 | Rokey ..................... B29B 7/481 366/132 |
| 2011/0182132 | A1 | 7/2011 | Lechner et al. |
| 2011/0182133 | A1 | 7/2011 | Padmanabhan |

FOREIGN PATENT DOCUMENTS

| | | |
|---|---|---|
| EP | 0 269 913 A2 | 6/1988 |
| EP | 2 353 839 A1 | 8/2011 |
| JP | 61-175428 U | 11/1986 |
| JP | 8-210775 A | 8/1996 |
| JP | 9-109231 A | 4/1997 |
| JP | 10-34730 A | 2/1998 |
| JP | 11-277604 A | 10/1999 |
| JP | 2001-47496 A | 2/2001 |
| JP | 2001-322154 A | 11/2001 |
| JP | 2001-322155 A | 11/2001 |
| JP | 2003-266435 A | 9/2003 |
| JP | 2007-326232 A | 12/2007 |
| WO | 2007033328 A2 | 3/2007 |
| WO | 2009062525 A1 | 5/2009 |

OTHER PUBLICATIONS

Communication issued Dec. 18, 2015, issued by the State Intellectual Property Office of the People's Republic of China in counterpart Chinese Patent Application No. 201380011988.5.
Communication dated Sep. 15, 2015 issued by the European Patent Office in counterpart European Patent Application No. 13755712.0.
International Search Report dated May 21, 2013 issued in International Application No. PCT/JP2013/055520 (PCT/ISA/210).
Written Opinion dated May 21, 2013 issued in International Application No. PCT/JP2013/055520 (PCT/ISA/237).
Communication issued Dec. 18, 20125, issued by the State Intellectual Property Office of the People's Republic of China in counterpart Chinese Patent Application No. 201380011988.5.

* cited by examiner

SCREW PAIR AND CO-ROTATING INTERMESHING TWIN-SCREW EXTRUDER PROVIDED WITH SCREW PAIR

TECHNICAL FIELD

The present invention relates to a screw pair for a co-rotating intermeshing type twin-screw extruder which removes a liquid component from a thermoplastic synthetic resin raw material containing a liquid component.

BACKGROUND ART

For example, in a thermoplastic synthetic resin raw material (hereinafter, referred to as simply a synthetic resin raw material) such as plastic or rubber containing a liquid component such as water, the synthetic resin raw material is molded into a synthetic resin molding product after the liquid component is removed. When the liquid component is removed from the synthetic resin raw material, in the related art, a co-rotating intermeshing type twin-screw extruder (hereinafter, referred to as simply an extruder) is used.

The extruder used when the liquid component is removed from the synthetic resin raw material is described with reference to FIGS. 17(a) and 17(b). FIGS. 17(a) and 17(b) are an upper cross-sectional view and a side cross-sectional view showing an outline of a general extruder.

As shown in FIGS. 17(a) and 17(b), an extruder 1 includes a cylinder 2 having a cylindrical shape, and a die 3 provided on one end of the cylinder 2. The cylinder 2 includes a raw material supply port 4 for inputting a synthetic resin raw material into the cylinder 2, and a liquid discharge port 5 for discharging a liquid component removed from the synthetic resin raw material from the inner portion of the cylinder 2.

In addition, the extruder 1 includes a pair of screws 6 which is rotatably accommodated in the cylinder 2. The pair of screws 6 is disposed such that rotary axes R of the screws 6 are parallel with each other.

Each screw 6 includes a transport portion 6a which transports the synthetic resin raw material in the cylinder 2 from a raw material supply port 4 in an X1 direction toward the die 3, and a throttling portion 6b which kneads the synthetic resin raw material and removes the liquid component from the synthetic resin raw material. The transport portion 6a and the throttling portion 6b are alternately disposed in the X1 direction, the synthetic resin raw material supplied from the raw material supply port 4 is transported to the throttling portion 6b by the transport portion 6a, passes through the throttling portion 6b, and is transported to the die 3.

When the liquid component of the synthetic resin raw material passes through the throttling portion 6b, the liquid component is removed from the synthetic resin raw material. The synthetic resin raw material, in which the liquid component is removed, is transported from the throttling portion 6b toward the die 3, and is extruded from the inner portion of the cylinder 2 while being molded to a predetermined shape by the die 3.

The liquid component removed from the synthetic resin raw material flows through the transport portion 6a from the throttling portion 6b in an X2 direction opposite to the X1 direction. The liquid discharge port 5 is formed on the X2 direction side of the throttling portion 6b, and the liquid component removed from the synthetic resin raw material is discharged from the inner portion of the cylinder 2 through the liquid discharge port 5.

As one of factors which determine a capability (hereinafter, also referred to as a transportation capability) for transporting the synthetic resin raw material of the screw 6 in the X1 direction or a capability (hereinafter, also referred to as a draining capability) for causing the liquid component removed from the synthetic resin raw material to flow in the X2 direction, there is a structure of the transport portion 6a. Structures of various transport portions 6a capable of improving the transportation capability of the screw 6 or the draining capability have been suggested (for example, PTL 1).

The structure of a transport portion referred to as an angle flight screw piece which is disclosed in PTL 1 will be described using FIGS. 18(a) and 18(b). FIG. 18(a) is an outline view of a pair of angle flight screw pieces, and FIG. 18(b) is a cross-sectional view taken along line A-A of FIG. 18(a).

As shown in FIGS. 18(a) and 18(b), the angle flight screw piece 7 includes an outer circumferential surface 9 in which a groove 8 is spirally formed. In the inner surface of the groove 8, a first surface 8a facing in the X1 direction and a second surface 8b facing in the X2 direction are erected to be approximately perpendicular with respect to an axis center of the angle flight screw piece 7 from a bottom surface 8c of the groove 8.

The synthetic resin raw material input into the cylinder 2 (refer to FIGS. 17(a) and 17(b)) enters the inner portion of the groove 8. According to a rotation of the angle flight screw piece 7 the first surface 8a presses the synthetic resin raw material in the X1 direction. As a result, the synthetic resin raw material is transported in the X1 direction. The liquid component removed from the synthetic resin raw material flows in the X2 direction via a space in the groove 8 where the synthetic resin raw material is not present.

Since the first surface and the second surfaces 8a and 8b are parallel with each other in the angle flight screw piece 7, a volume of the groove 8 is relatively large. Accordingly, a sufficient space through which the synthetic resin raw material or the liquid component moves is easily secured. As a result, the liquid component easily flows in the X2 direction and the draining capability of the screw 6 (refer to FIGS. 17(a) and 17(b)) is improved.

However, in the angle flight screw piece 7, when the synthetic resin raw material is transported, a portion of the synthetic resin raw material may adhere to the first surface 8a. The synthetic resin raw material adhering to the first surface 8a is not easily transported in the X1 direction, and thus, the transportation capability of the screw 6 (refer to FIGS. 17(a) and 17(b)) is decreased. In PTL 1, a structure of a transport portion referred to as a ball flight screw piece, which has a higher transportation capability than the angle flight screw piece, is also disclosed.

FIG. 19(a) is an outline view of a pair of ball flight screw pieces, and FIG. 19(b) is a cross-sectional view taken along line B-B of FIG. 19(a). Moreover, the same reference numerals are assigned to the same components as those shown in FIGS. 18(a) and 18(b), and the components are simply described.

The first and second surfaces 8a and 8b of one ball flight screw piece 10 and the outer circumferential surface 9 of the other ball flight screw piece 10 are curved to come into contact with each other. Accordingly, the pair of ball flight screw pieces 10 are rotated in the same direction, and the first and second surfaces 8a and 8b of the one ball flight screw piece 10 are in slide-contact with the outer circumferential surface 9 of the other ball flight screw piece 10.

In the pair of ball flight screw pieces 10, the outer circumferential surface 9 of the other ball flight screw piece 10 is in slide-contact with the first surface 8*a* of the one ball flight screw piece 10. Accordingly, the synthetic resin raw material adhering to the first surface 8*a* of the one ball flight screw piece 10 is scraped off.

The other ball flight screw piece 10 also has a configuration similar to the one ball flight screw piece 10. That is, the pair of ball flight screw pieces 10 can transport the synthetic resin raw material without the adhesion of the synthetic resin raw material on the first surface 8*a* of each ball flight screw piece 10. Accordingly, in the ball flight screw pieces 10, a relatively high transportation capability can be obtained.

CITATION LIST

Patent Literature

PTL 1: JP-A-2007-326232

SUMMARY OF INVENTION

Technical Problem

However, as shown in FIGS. 19(*a*) and 19(*b*), a width in the X1 direction of the groove 8 of the ball flight screw piece 10 gradually decreases from an opening side of the groove 8 toward the bottom surface 8*c* of the groove 8. Accordingly, the volume of the groove 8 of the ball flight screw piece 10 is smaller than that of the groove 8 of the angle flight screw piece 7 shown in FIGS. 18(*a*) and 18(*b*). Therefore, in the ball flight screw piece 10, when a lot of synthetic resin raw materials are input into the cylinder 2 (refer to FIGS. 17(*a*) and 17(*b*)), the groove 8 is filled with the synthetic resin raw materials, the space though which the liquid component flows cannot be sufficiently secured, and there is a concern that the draining capability may be decreased.

For example, if the draining capability is decreased, the liquid component removed from the synthetic resin raw material cannot be discharged by the throttling portion 6*b* (refer to FIGS. 17(*a*) and 17(*b*)), and the liquid component is input again to the synthetic resin raw material passing through the throttling portion 6*b*. In this case, since the synthetic resin raw material extruded from the die 3 (refer to FIGS. 17(*a*) and 17(*b*)) includes the liquid component, a defective product easily occurs when the synthetic resin molding product is molded.

Accordingly, the present invention is made in consideration of the above problems, and an object thereof is to improve a draining capability of a screw without decreasing a transportation capability of the screw.

Solution to Problem

In order to achieve the above object, according to one illustrative aspect of the present invention, there is provided a screw pair comprising: first and second screws for a co-rotating intermeshing type twin-screw extruder, the first and second screws having an outer circumferential surface on which a groove is spirally formed, wherein the first and second screws are configured to rotate about an axis center of each screw in a state where the first and second screws mesh with each other and to transport a raw material in a predetermined direction along the axis center, and wherein an inner surface of the groove of each of the first and second screws comprises: a first surface, which faces in the predetermined direction, and in which the outer circumferential surfaces of the first and second screws are formed to coincide with each other without a gap therebetween in the state where the first and second screws mesh with each other; and a second surface, which faces in a direction opposite to the predetermined direction, and which forms a gap between the outer circumferential surfaces of the first and second screws in the state where the first and second screws mesh with each other.

Advantageous Effects of Invention

According to the present invention, it is possible to improve a draining capability of a screw without decreasing a transportation capability of the screw.

DESCRIPTION OF EMBODIMENTS

Figure 1:
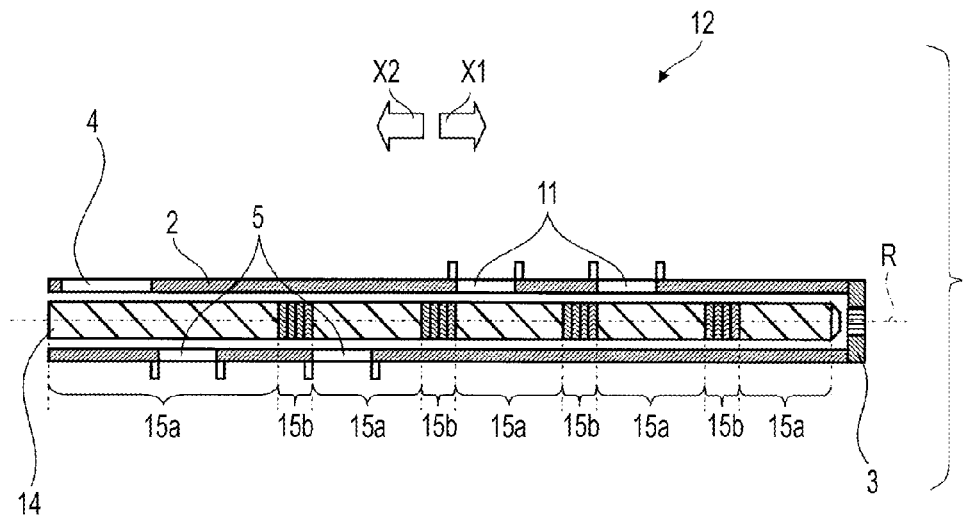
FIG. 1 is a side cross-sectional view showing an outline of an example of an extruder to which the present invention is applicable.

Hereinafter, an embodiment of the present invention will be described with reference to the drawings. Incidentally, the same reference numerals are assigned to the same components as those shown in FIGS. 17(a) to 19(b), and the components are simply described.

Example

Figure 2:
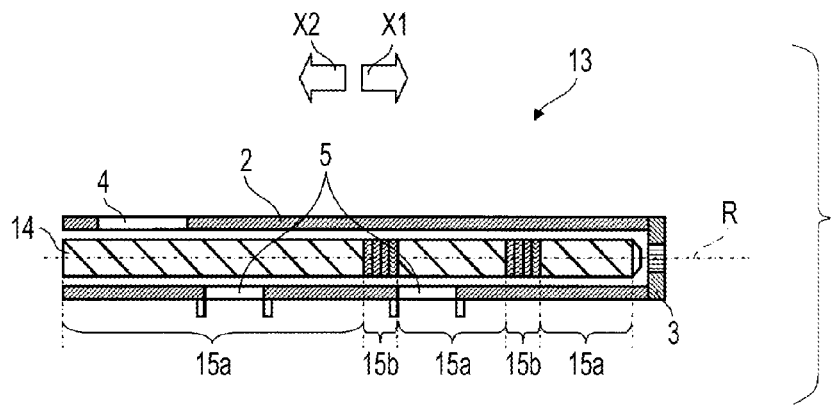
FIG. 2 is a side cross-sectional view showing an outline of another example of the extruder to which the present invention is applicable.

FIG. 1 is a side cross-sectional view showing an outline of an example of a co-rotating intermeshing type twin-screw extruder (hereinafter, referred to as an extruder) to which the present invention is applicable. FIG. 2 is a side cross-sectional view of an outline of another example of the extruder to which the present invention is applicable.

When a liquid component is removed from a synthetic resin raw material using the extruder, a volatile component may occur. In the extruder shown in FIG. 1, a vent 11 for discharging the volatile component is formed on a cylinder 2. The extruder is referred to as a co-rotating intermeshing type twin-screw extruder having a vent (hereinafter, referred to as an extruder 12 having a vent).

In the extruder shown in FIG. 2, the vent is not provided on the cylinder 2. The extruder is referred to as a co-rotating intermeshing type twin-screw extruder without a vent (hereinafter, referred to as an extruder 13 without a vent).

Whether or not the extruder 12 having a vent is used or the extruder 13 without a vent is used is determined by properties required for the synthetic resin raw material in which the liquid component is removed.

For example, in the extruder 12 having a vent, the liquid component is removed from the synthetic resin raw material and the volatile component is discharged from the vent 11. Accordingly, in the extruder 12 having a vent, a synthetic resin raw material without including bubbles is obtained.

On the other hand, in the extruder 13 without a vent, almost no volatile component generated when the synthetic resin raw material is kneaded is discharged from the inner portion of the cylinder 2. Accordingly, in the extruder 13 without a vent, the synthetic resin raw material is extruded from the cylinder 2 along with the volatile component, and a synthetic resin raw material including the bubbles is obtained.

The present invention can be applied to either the extruder 12 having a vent or the extruder 13 without a vent. Hereinafter, the extruder 12 having a vent and the extruder 13 without a vent will not be distinguished from each other and will be described as an extruder.

As shown in FIGS. 1 and 2, the extruder includes the cylinder 2, and a pair of screws 14 which is rotatably accommodated in the cylinder 2, and a die 3 which is provided at one end of the cylinder 2. The pair of screws 14 is disposed such that rotary axes R of the screws 14 are parallel with each other.

Each screw 14 includes: a transport portion 15a configured to transport the synthetic resin raw material in the cylinder 2 in a predetermined direction (hereinafter, referred to as an X1 direction) from the raw material supply port 4 toward the die 3; and a throttling portion 15b configured to knead the synthetic resin raw material and remove the liquid component from the synthetic resin raw material. The transport portion 15a and the throttling portion 15b are alternately disposed in the X1 direction. Accordingly, the synthetic resin raw material, which is input from the raw material supply port 4 into the cylinder 2, is transported to the throttling portion 15b by the transport portion 15a, passes through the throttling portion 15b, and is transported to the die 3.

A liquid discharge port 5 is formed on an X2 direction side opposite to the X1 direction of the throttling portion 15b in the cylinder 2. The liquid component, which is removed from the synthetic resin raw material by the throttling portion 15b, flows through the transport portion 15a from the throttling portion 15b in the X2 direction, and is discharged from the liquid discharge port 5.

The numbers of the liquid discharge ports 5 and the throttling portions 15b are not particularly limited. That is, one liquid discharge port 5 and one throttling portion 15b may be provided, and a plurality of liquid discharge ports 5 and a plurality of throttling portions 15b may be provided. If possible, preferably, the numbers of the liquid discharge ports 5 and the throttling portions 15b are optimized according to a content of the liquid component in the synthetic resin raw material input into the cylinder 2. This is because the manufacturing cost of the extruder is increased although the capability of removing the liquid component from the synthetic resin raw material is improved according to the increase of the numbers of the liquid discharge ports 5 and the throttling portions 15b.

For example, when the content of the liquid component in the synthetic resin raw material is relatively large, the numbers of the liquid discharge ports 5 and the throttling portions 15b are increased. When the content of the liquid component in the synthetic resin raw material is relatively small, one liquid discharge port 5 and one throttling portion 15b are provided. By optimizing the numbers of the liquid discharge ports 5 and the throttling portions 15b according to the content of the liquid component in the synthetic resin raw material, the liquid component can be sufficiently removed from the synthetic resin raw material, and the increase in the manufacturing cost of the extruder can be suppressed.

Figure 3:
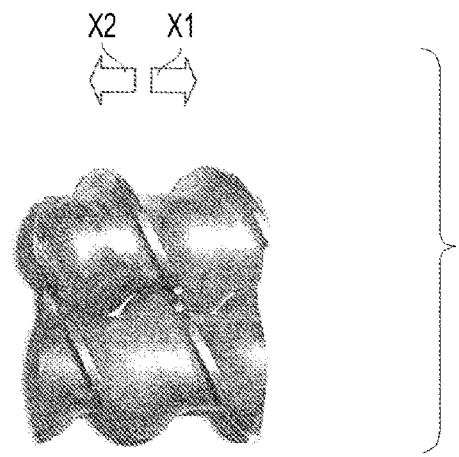
FIG. 3 is a photograph of an outline in a state where transport portions of a screw pair according to an example of the present invention mesh with each other.
Figure 4:
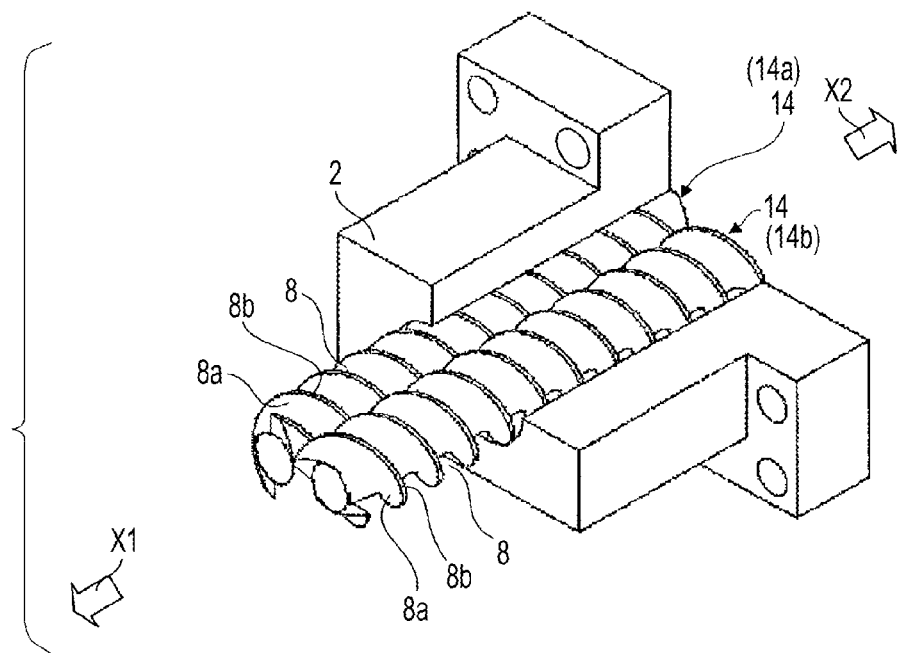
FIG. 4 is a perspective view of the state where the transport portions of the screw pair according to an example of the present invention mesh with each other.
Figure 5:
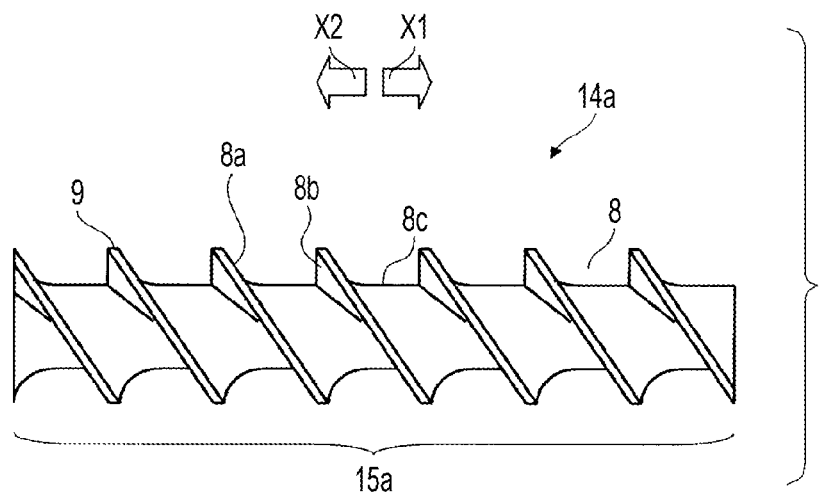
FIG. 5 is a side view of the transport portion of the screw according to the example of the present invention.
Figure 6:
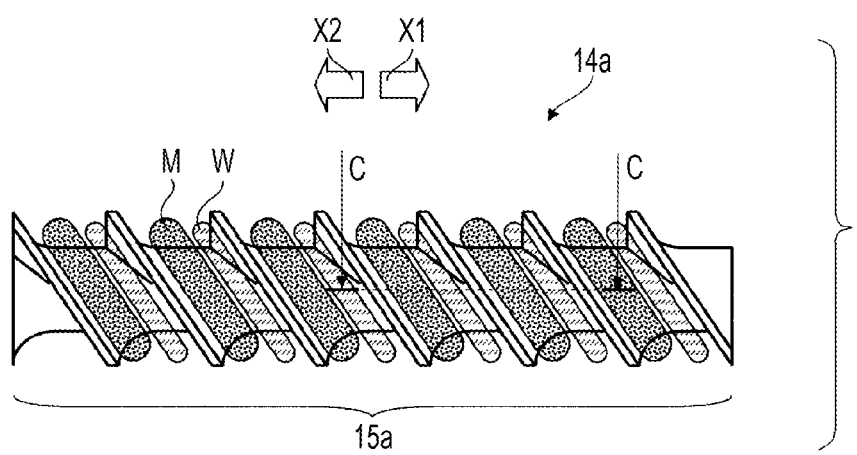
FIG. 6 is a view for illustrating flows of a synthetic resin raw material and a liquid component in the transport portion of the screw shown in FIG. 5.
Figure 7:
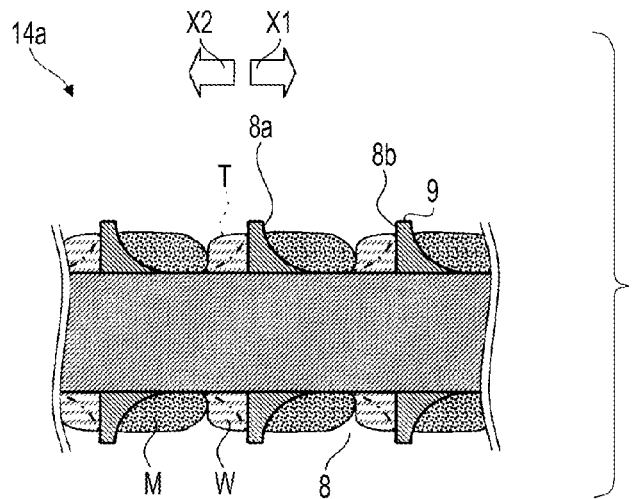
FIG. 7 is a cross-sectional view taken along line C-C of the screw shown in FIG. 6.

The pair of screws 14 according to an embodiment of the present invention will be described with reference to FIGS. 3 to 7. FIGS. 3 and 4 are a photograph of an outline and a perspective view in a state where transport portions 15a of the pair of screws 14 mesh with each other. FIG. 5 is a side view of the transport portion 15a. FIG. 6 is a view for illustrating flows of a synthetic resin raw material and a liquid component in the transport portion 15a of the screw 14 shown in FIG. 5. FIG. 7 is a cross-sectional view taken along line C-C of the screw 14 shown in FIG. 6.

As shown in FIGS. 3 to 7, the transport portion 15a of the screw 14 includes an outer circumferential surface 9 on which the groove 8 is spirally formed. The inner surface of the groove 8 includes: a first surface 8a facing in the X1 direction; and a second surface 8b facing in the X2 direction.

In a state where the first and second screws 14 are installed in the extruder, the first and second screws mesh with each other such that a portion of the outer circumferential surface 9 of one screw 14 (hereinafter, referred to as a first screw 14a) enters a portion of the groove 8 of the other screw 14 (hereinafter, referred to as a second screw 14b).

A synthetic resin raw material M input into the cylinder 2 enters the inner portion of the groove 8, and is transported in the X1 direction by the first surface 8a of the groove 8 according to the rotations of the first and second screws 14a and 14b. A liquid component W, which is removed from the synthetic resin raw material M by the throttling portion 15b (refer to FIGS. 1 and 2), flows in the X2 direction through a space in which the synthetic resin raw material M is not present in the groove 8.

The first surface 8a of the first screw 14a is formed such that the outer circumferential surface 9 of the second screw 14b coincides with the first surface of the first screw without a gap therebetween in a state where the first and second screws 14a and 14b mesh with each other. Accordingly, when the first and second screws 14a and 14b are rotated in the same direction, the outer circumferential surface 9 of the second screw 14b is in slide-contact with the first surface 8a of the first screw 14a.

When the transport portions 15a of the first and second screws 14a and 14b transport the synthetic resin raw material M, the synthetic resin raw material 114 may adhere to the first surface 8a of the groove 8. When the outer circumferential surface 9 of the second screw 14b slide-contacts with the first surface 8a of the first screw 14a, the synthetic resin raw material M adhering to the first surface 8a of the first screw 14a is wiped away. Accordingly, the synthetic resin raw material M in the groove 8 of the first screw 14a is effectively transported, and the transportation capability of the first screw 14a is improved.

In the state where the first and second screws 14a and 14b mesh with each other, a gap is formed between the second surface 8b of the first screw 14a and the outer circumferential surface 9 of the second screw 14b.

For example, in the present example, the second surface 8b of the first screw 14a is erected from the bottom surface 8c of the groove 8 to be approximately parallel in a radial direction (which means a direction in which a virtual plane perpendicular to the axis center radially extends from the axis center) with the first screw 14a. Accordingly, compared with when the second surface 8b of the first screw 14a comes into contact with the outer circumferential surface 9 of the second screw 14b, a cross-sectional width in the X1 direction of the groove 8 of the first screw 14a can be increased. As a result, the volume of the groove 8 of the first screw 14a can be increased.

The space in which the synthetic resin raw material 114 is not present in the groove 8 is increased as the volume of the groove 8 is increased, and thus, the liquid component W easily flows in the X2 direction in the transport portion 15a. As a result, a draining capability of the first screw 14a is improved.

In the present embodiment, the first and second surfaces 8a and 8b of the second screw 14b are also formed similar to the first and second surfaces 8a and 8b of the first screw 14a. Accordingly, the synthetic resin raw material M adhering to the first surface 8a of the second screw 14b is wiped away by the outer circumferential surface 9 of the first screw 14a. In addition, a cross-sectional width in the X1 direction of the groove 8 of the second screw 14b is relatively large, and the volume of the groove 8 of the second screw 14b is increased.

Figure 8:
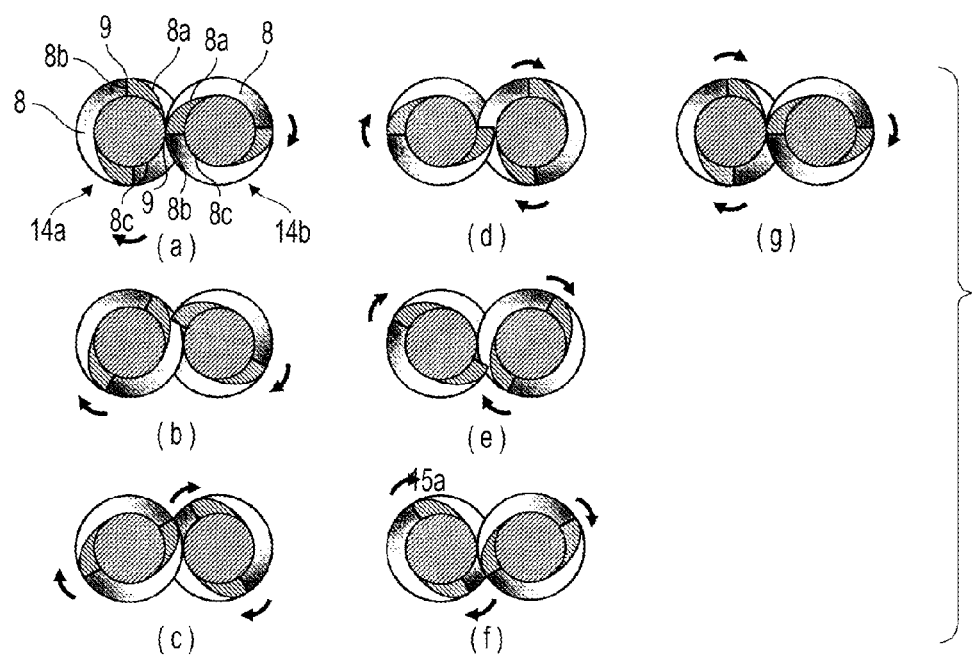
FIGS. 8(*a*) to 8(*g*) are cross-sectional views when cross sections perpendicular to the X1 direction in the screw pair according to the embodiment of the present invention are viewed in the X2 direction, wherein FIG. 8(*a*) is a cross-sectional view at a predetermined timing, and FIGS. 8(*b*) to 8(*g*) are cross-sectional views when the first and second screws are rotated by 30°, 60°, 90°, 120°, 150°, and 180° from the state shown in FIG. 8(*a*).

Here, when the first and second screws 14a and 14b are rotated, positional relationships between the first and second surfaces 8a and 8b of the first screw 14a and the outer circumferential surface 9 of the second screw 14b and positional relationships between the first and second surfaces 8a and 8b of the second screw 14b and the outer circumferential surface 9 of the first screw 14a will be described with reference to FIG. 8.

FIGS. 8(a) to 8(g) are cross-sectional views when cross sections perpendicular to the X1 direction of the first and second screws 14a and 14b meshing with each other are viewed in the X2 direction. FIG. 8(a) is a cross-sectional view at a predetermined timing, and FIGS. 8(b) to 8(g) are cross-sectional views when the first and second screws 14a and 14b are rotated by 30°, 60°, 90°, 120°, 150°, and 180° from the state shown in FIG. 8(a).

Incidentally, in descriptions with respect to FIGS. 8(a) to 8(g), the first and second surfaces 8a and 8b and the bottom surface 8c mean only the locations shown by the cross sections in FIGS. 8(a) to 8(g), and the outer circumferential surfaces 9 mean surfaces other than the inner surfaces of the grooves 8 among the locations shown by the cross sections in FIGS. 8(a) to 8(g).

In the state shown in FIG. 8(a), the outer circumferential surface 9 of the second screw 14b comes into contact with the bottom surface 8c of the groove 8 of the first screw 14a. From the state shown in FIG. 8(a) to the state shown in FIG. 8(b), the first surface 8a of the first screw 14a is in slide-contact with the outer circumferential surface 9 of the second screw 14b. Thereafter, the outer circumferential surface 9 of the second screw 14b is separated from the first screw 14a.

From the state shown in FIG. 8(b) to the state shown in FIG. 8(d) via the state shown in FIG. 8(c), the outer circumferential surface 9 of the first screw 14a approaches the bottom surface 8c of the groove 8 of the second screw 14b. Since the second surface 8b of the second screw 14b is erected from the bottom surface 8c of the groove 8 to be approximately parallel to the radial direction of the second screw 14b, the outer circumferential surface 9 of the first screw 14a does not come into contact with the second screw 14b.

When it reaches the state shown in FIG. 8(d), the outer circumferential surface 9 of the first screw 14a comes into contact with the bottom surface 8c of the groove 8 of the second screw 14b. From the state shown in FIG. 8(d) to the state shown in FIG. 8(e), the first surface 8a of the second screw 14b is in slide-contact with the outer circumferential surface 9 of the first screw 14a. Thereafter, the outer circumferential surface 9 of the first screw 14a is separated from the second screw 14b.

From the state shown in FIG. 8(e) to the state shown in FIG. 8(g) via the state shown in FIG. 8(f), the outer circumferential surface 9 of the second screw 14b approaches the bottom surface 8c of the groove 8 of the first screw 14a. Since the second surface 8b of the first screw 14a is erected from the bottom surface 8c of the groove 8 to be approximately parallel to the radial direction of the first screw 14a, the outer circumferential surface 9 of the second screw 14b does not come into contact with the first screw 14a.

The first and second screws 14a and 14b have the above-described positional relationships.

Figure 9:
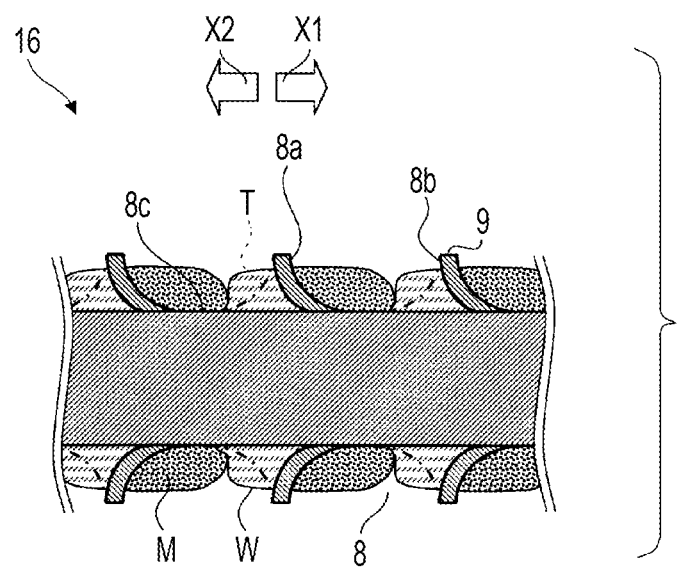
FIG. 9 is a cross-sectional view of a screw according to another example of the present invention.

As shown in FIG. 9, the second surface 8b may be curved to protrude in the X1 direction from an opening side of each groove 8 of the first and second screws 14a and 14b toward the bottom surface 8c of the groove 8. FIG. 9 is a cross-sectional view of a screw 16 according to another example of the present invention.

The volume of the groove 8 of the screw 16 shown in FIG. 9 is larger than that of the groove 8 of each screw 14 shown in FIGS. 8(a) to 8(g). Accordingly, the draining capability of the screw 16 shown in FIG. 9 is further improved.

Incidentally, in the first and second screws 14a and 14b shown in FIGS. 3 to 8(g), even when the first and second screws 14a and 14b are rotated in the same direction in the state where the first and second screws mesh with each other, the outer circumferential surface 9 of the second screw 14b is not in slide-contact with the second surface 8b of the first screw 14a. Accordingly, there may be a concern that the transportation capability of the first screw 14a may be decreased.

However, the synthetic resin raw material M in the groove 8 is transported in the X1 direction by being pressed to the first surface 8a. That is, the synthetic resin raw material M does not substantially come into contact with the second surface 8b, and thus, the synthetic resin raw material M does not adhere to the second surface 8b. Accordingly, even when the second surface 8b of the first screw 14a is not in slide-contact with the outer circumferential surface 9 of the second screw 14b, the transportation capability of the first screw 14a is almost not decreased.

Similarly, the transportation capability of the second screw 14b is almost not decreased.

Hereinafter, in order to verify effects of the present invention, tests comparing drain capabilities with respect to the screw 14 according to the example of the present invention and the screw of the related art will be described.

Comparative Example

Figure 10:
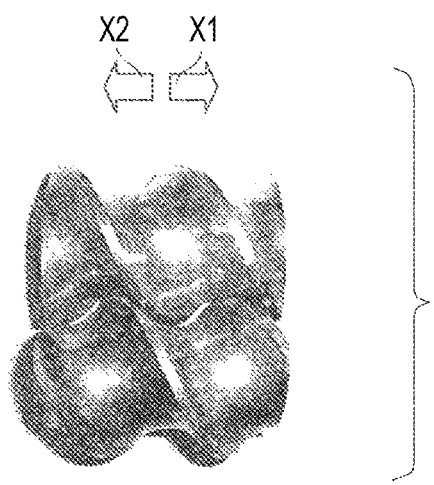
FIG. 10 is a photograph of the outline in a state where transport portions of a screw pair according to a comparative example mesh with each other.
Figure 11:
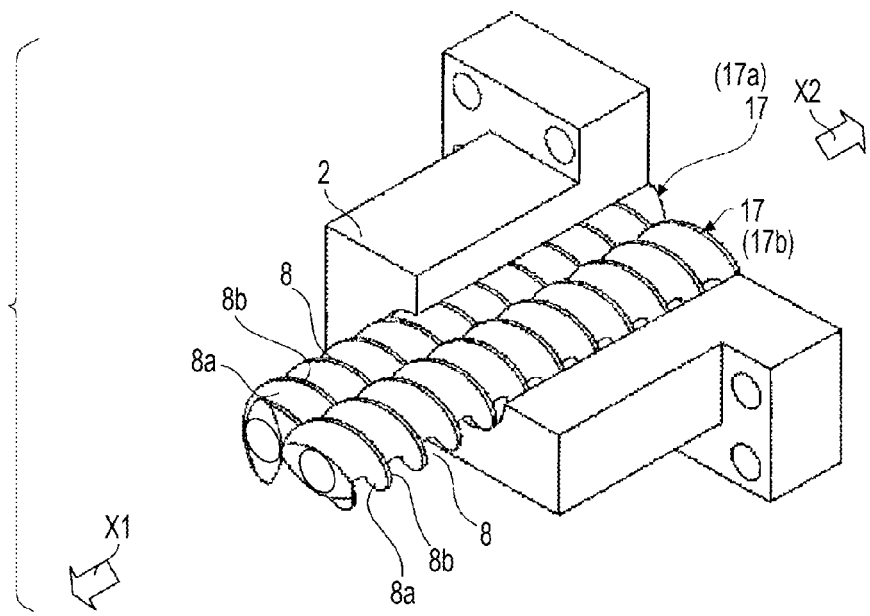
FIG. 11 is a perspective view of the state where the transport portions of the screw pair according to the comparative example mesh with each other.
Figure 12:
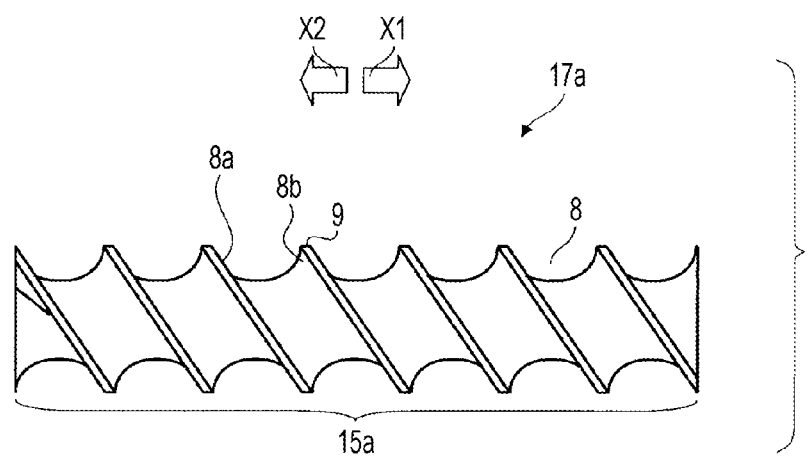
FIG. 12 is a side view of the transport portion of the screw according to the comparative example.
Figure 13:
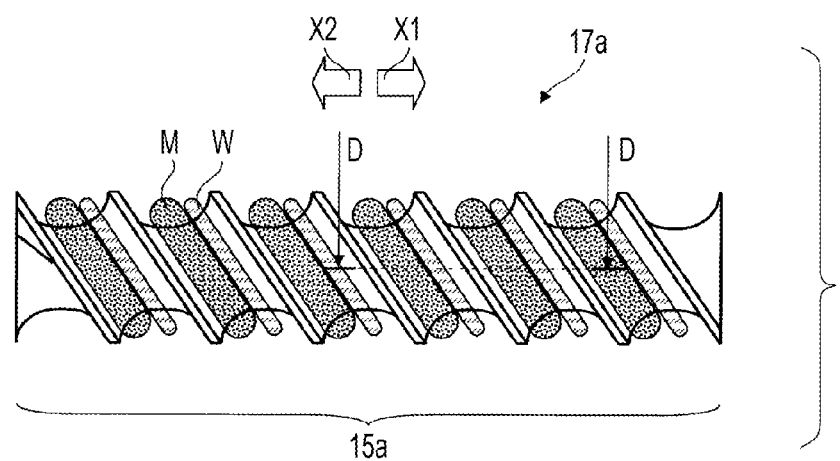
FIG. 13 is a view for illustrating flows of a synthetic resin raw material and a liquid component in the transport portion of the screw shown in FIG. 12.

A screw used as the comparative example will be described with reference to FIGS. 10 to 14. FIGS. 10 and 11 are a photograph and a perspective view of the outline in a state where transport portions of a pair of screws according to the comparative example mesh with each other. FIG. 12 is a side view of the transport portion. FIG. 13 is a view for illustrating flows of a synthetic resin raw material and a liquid component in the transport portion of the screw shown in FIG. 12.

Figure 14:
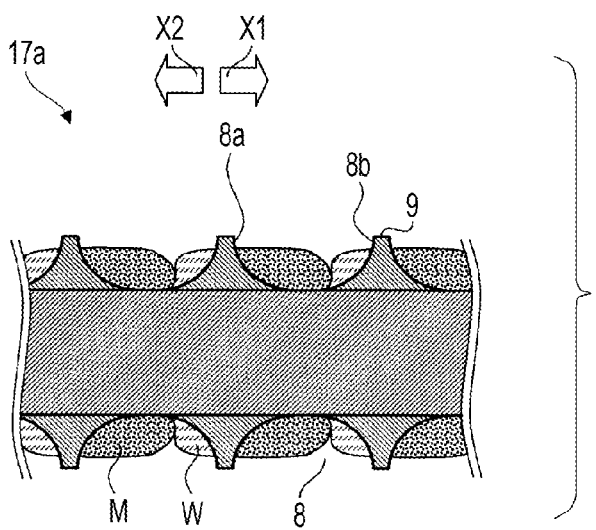
FIG. 14 is a cross-sectional view taken along line D-D of the screw shown in FIG. 13.

FIG. 14 is a cross-sectional view taken along line D-D of the screw shown in FIG. 13.

As shown in FIGS. 10 to 14, the first and second surfaces 8a and 8b of the first screw 17a according to the comparative example are formed such that the outer circumferential surfaces 9 of the first and second screws 17a and 17b coincide with each other without a gap therebetween in the state where the first and second screws 17a and 17b mesh with each other. Accordingly, if the first and second screws 17a and 17b are rotated in the same direction, the outer circumferential surface 9 of the second screw 17b is in slide-contact with the first and second surfaces 8a and 8b of the first screw 17a.

As the second surface 8b of the first screw 17a according to the comparative example is formed in this way, the volume of the groove 8 of the first screw 17a is smaller than that of the groove 8 of the first screw 14a according to the example.

The second screw 17b according to the comparative example is also formed similar to the first screw 17a according to the comparative example, and the volume of the groove 8 of the second screw 17b according to the comparative example is smaller than that of the groove 8 of the second screw 17b according to the example.

Figure 15:
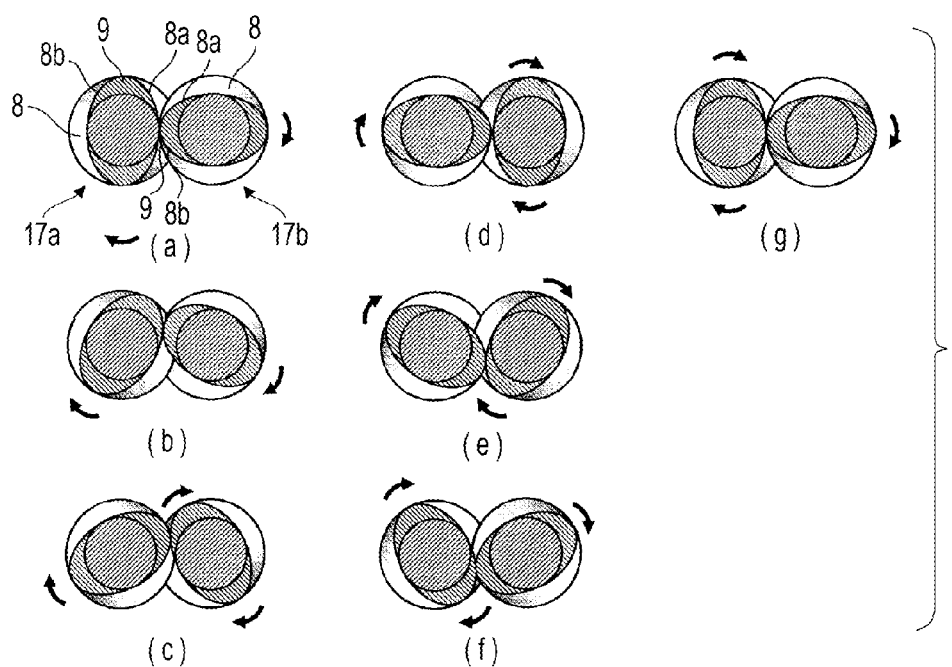
FIGS. 15(*a*) to 15(*g*) are cross-sectional views when a cross-section perpendicular to the X1 direction in the screw pair according to the comparative example is viewed in the X2 direction, wherein FIG. 15(*a*) is a cross-sectional view at a predetermined timing, and FIGS. 15(*b*) to 15(*g*) are cross-sectional views when the first and second screws are rotated by 30°, 60°, 90°, 120°, 150°, and 180° from the state shown in FIG. 15(a).

Here, when the first and second screws 17a and 17b are rotated, positional relationships between the first and second surfaces 8a and 8b of the first screw 17a and the outer circumferential surface 9 of the second screw 17b and positional relationships between the first and second surfaces 8a and 8b of the second screw 17b and the outer circumferential surface 9 of the first screw 17a will be described with reference to FIG. 15.

FIGS. 15(a) to 15(g) are cross-sectional views when cross sections perpendicular to the X1 direction of the first and second screws 17a and 17b meshing with each other are viewed in the X2 direction. FIG. 15(a) is a cross-sectional view at a predetermined timing, and FIGS. 15(b) to 15(g) are cross-sectional views when the first and second screws 17a and 17b are rotated by 30°, 60°, 90°, 120°, 150°, and 180° from the state shown in FIG. 15(a).

Incidentally, in descriptions with respect to FIGS. 15(a) to 15(g), the first and second surfaces 8a and 8b mean only the locations shown by the cross sections in FIGS. 15(a) to 15(g), and the outer circumferential surfaces 9 mean surfaces other than the inner surfaces of the grooves 8 among the locations shown by the cross sections in FIGS. 15(a) to 15(g).

In the state shown in FIG. 15(a), the outer circumferential surface 9 of the second screw 17b comes into contact with the first surface 8a of the first screw 17a. From the state shown in FIG. 15(a) to the state shown in FIG. 15(b), the first surface 8a of the first screw 17a is in slide-contact with the outer circumferential surface 9 of the second screw 17b. Thereafter, the outer circumferential surface 9 of the second screw 17b is separated from the first screw 17a.

When it reaches the state shown in FIG. 15(c), the outer circumferential surface 9 of the first screw 17a comes into contact with the second surface 8b of the second screw 17b. From the state shown in FIG. 15(c) to the state shown in FIG. 15(d), the second surface 8b of the second screw 17b is in slide-contact with the outer circumferential surface 9 of the first screw 17a.

When it reaches the state shown in FIG. 15(d), the outer circumferential surface 9 of the first screw 17a comes into contact with the first surface 8a of the second screw 17b. From the state shown in FIG. 15(d) to the state shown in FIG. 15(e), the first surface 8a of the second screw 17b is in slide-contact with the outer circumferential surface 9 of the first screw 17a. Thereafter, the outer circumferential surface 9 of the first screw 17a is separated from the second screw 17b.

When it reaches the state shown in FIG. 15(f), the outer circumferential surface 9 of the second screw 17b comes into contact with the second surface 8b of the first screw 17a. From the state shown in FIG. 15(f) to the state shown in FIG. 15(g), the second surface 8b of the first screw 17a is in slide-contact with the outer circumferential surface 9 of the second screw 17b.

The first and second screws 17a and 17b have the above-described positional relationships.

(Comparison Result)

Next, a comparison result will be described. The screw 14 according to the example and the screw 17 according to the comparative example were applied to a co-rotating inter-meshing type twin-screw extruder TEX65 manufactured by Japan Steel Works, Ltd., and thus, a comparative test of displacement was performed. Moreover, a diameter of the screw in the comparative test was set to 69 mm.

As a synthetic resin, Ethylene-Propylene-diene terpolymer (EPDM) was used. Moreover, as the synthetic resin raw material input to the cylinder 2 (refer to FIG. 1), a synthetic resin raw material including 50% water in a proportion by weight was used. An input amount into the cylinder 2 of the synthetic resin raw material containing water was set to 1000 kg/h, and a revolution speed of the screw was set 500 rpm.

In the comparative test, a value, which is obtained by dividing a lead of the screw (the product of a pitch of the groove 8 and the number of threads of the flight) by the diameter of the screw, was changed from 0.1 to 0.6 in stages. The results of the comparative test are shown in Table 1.

TABLE 1

| | Lead/ Screw Diameter | Amount of Discharged Water kg/h | Amount of Remaining Water kg/h | Proportion of Discharged Water % | Proportion of Remaining Water % |
|---|---|---|---|---|---|
| Example | 0.1 | 200 | 300 | 40.0 | 37.5 |
| | 0.25 | 270 | 230 | 54.0 | 31.5 |
| | 0.5 | 425 | 75 | 85.0 | 13.0 |
| | 0.75 | 450 | 50 | 90.0 | 9.1 |
| | 1 | 450 | 50 | 90.0 | 9.1 |
| | 1.5 | 430 | 70 | 86.0 | 12.3 |
| | 2 | 400 | 100 | 80.0 | 16.7 |
| | 3 | 370 | 130 | 74.0 | 20.6 |
| | 4 | 330 | 170 | 66.0 | 25.4 |
| | 6 | 250 | 250 | 50.0 | 33.3 |
| Comparative Example | 0.1 | 200 | 300 | 40.0 | 37.5 |
| | 0.25 | 250 | 250 | 50.0 | 33.3 |
| | 0.5 | 400 | 100 | 80.0 | 16.7 |
| | 0.75 | 425 | 75 | 85.0 | 13.0 |
| | 1 | 425 | 75 | 85.0 | 13.0 |
| | 1.5 | 400 | 100 | 80.0 | 16.7 |
| | 2 | 350 | 150 | 70.0 | 23.1 |
| | 3 | 330 | 170 | 66.0 | 25.4 |
| | 4 | 300 | 200 | 60.0 | 28.6 |
| | 6 | 250 | 250 | 50.0 | 33.3 |

In Table 1, an amount of the discharged water is an amount of the water discharged from the liquid discharge port 5 (refer to FIG. 1), and an amount of the remaining water is an amount of the water included in the synthetic resin raw material extruded from the die 3 (refer to FIG. 1). Moreover, a proportion of the discharged water is a value which is calculated by dividing the amount of the discharged water by the water amount included in the synthetic resin raw material before being input into the cylinder 2, and a proportion of the remaining water is a proportion by weight of the water included in the synthetic resin raw material extruded from the die 3.

Figure 16:
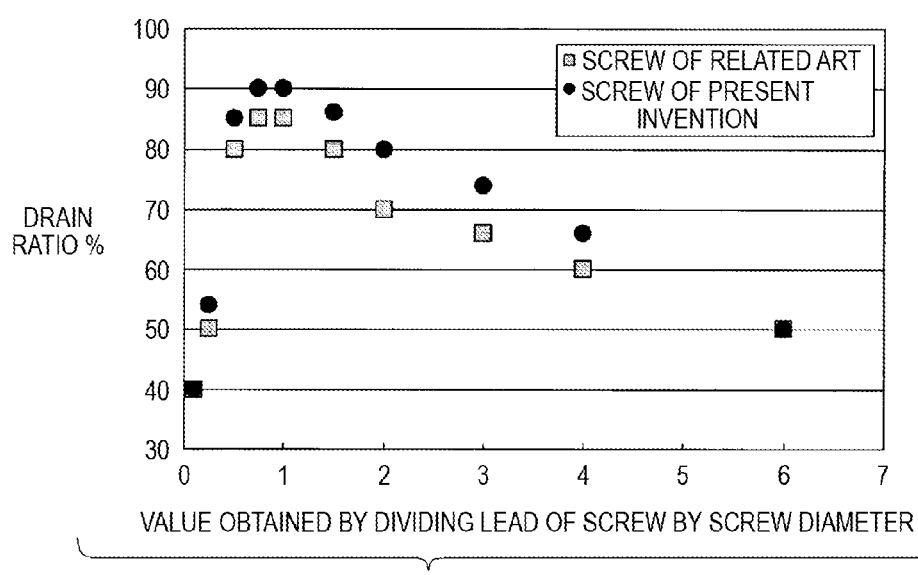
FIG. 16 is a graph in which a draining capability of the screw of the example of the present invention and the draining capability of the screw of the related art are compared to each other.
Figure 17:
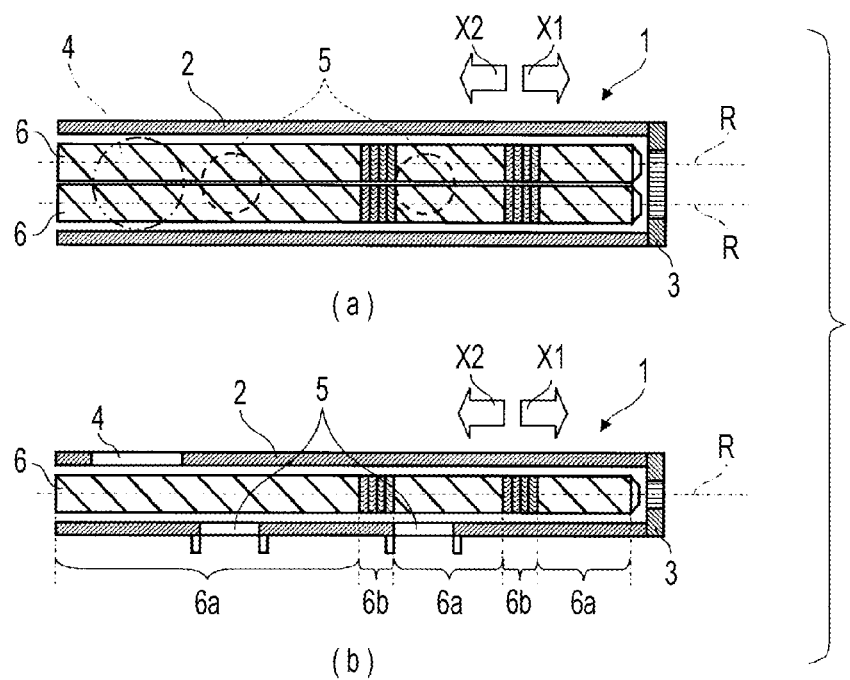
FIG. 17(a) is an upper cross-sectional view of an extruder of the related art.
FIG. 17(b) is a side cross-sectional view of the extruder of the related art.
Figure 18:
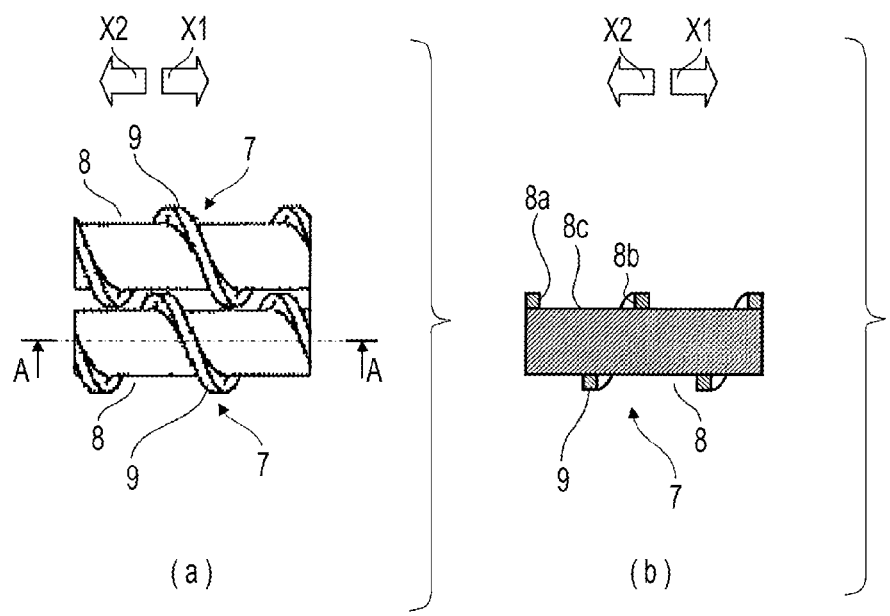
FIG. 18(a) is an outline view of an angle flight screw piece.
FIG. 18(b) is a cross-sectional view of the angle flight screw piece.
Figure 19:
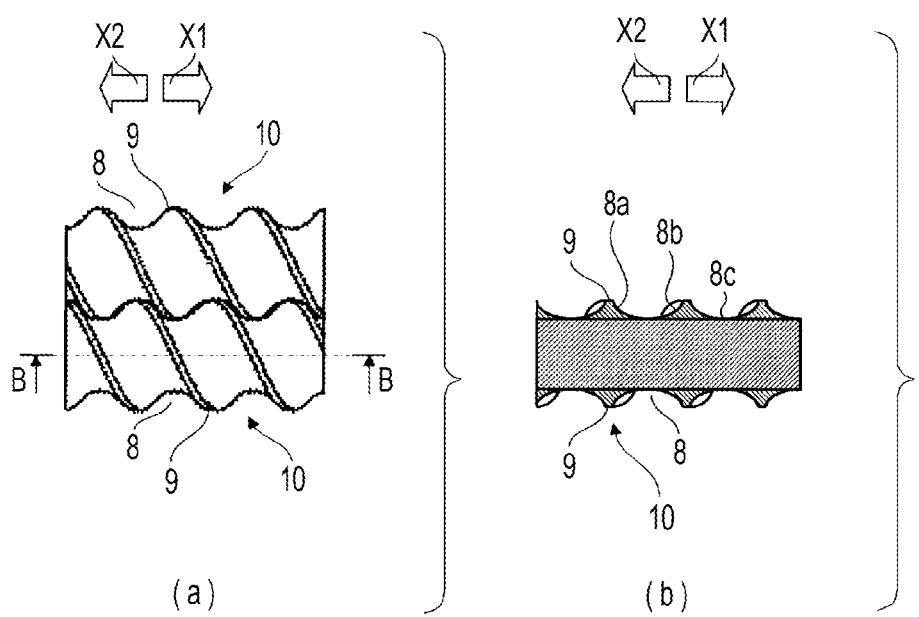
FIG. 19(a) is an outline view of a ball flight screw piece.
FIG. 19(b) is a cross-sectional view of the ball flight screw piece.

FIG. 16 is a graph showing the results of the comparative test in which a horizontal axis indicates a value obtained by dividing the lead of the screw by the screw diameter, and a vertical axis indicates a drain ratio. In FIG. 16, circular plots are the results for the screw 14 according to the example, and square plots are the results for the screw 17 according to the comparative example.

As is evident from Table 1 and FIG. 16, the drain ratio in the screw 14 of the example is higher than the drain ratio in the screw 17 of the comparative example. From this, it is understood that the draining capability of the screw 14 is improved by using the screw 14 according to the example.

Particularly, when the value obtained by dividing the lead by the screw diameter is from 0.5 to 3.0, the drain ratio of the screw 14 according to the example is far higher than the drain ratio of the screw 17 according to the comparative example. This is due to the following reasons.

That is, the value obtained by dividing the lead by the screw diameter is equal to or more than 0.5, and thus, the space, through which the water removed from the synthetic resin raw material flows, is sufficiently secured in the groove 8. Accordingly, the water removed from the synthetic resin raw material by the throttling portion 15b (refer to FIG. 1) is easily discharged.

In addition, the value obtained by dividing the lead by the screw diameter is less than or equal to 3.0, and thus, a sufficient amount of synthetic resin raw material enters the groove 8, and the synthetic resin raw material is easily transported to the throttling portion 15b (refer to FIG. 1). Accordingly, the synthetic resin raw material is pressed to the throttling portion 15b by a stronger force, and more water is removed from the synthetic resin raw material in the throttling portion 15b.

According to these reasons, the drain ratio of the screw 14 according to the example is increased. Therefore, since more liquid component is removed from the synthetic resin raw material, it is preferable that the value obtained by dividing the lead of the screw 14 according to the example by the screw diameter be from 0.5 to 3.0.

The present invention is not limited to the above-described embodiments, and modification, improvement, or the like can be appropriately performed. Moreover, the material, the shape, the dimensions, the value, the aspect, the number, the disposition place, or the like of each component in the above-described embodiments can arbitrarily be selected if they can achieve the present invention, and are not limited.

The present invention is described in detail with reference to specific embodiments. However, it is obvious to a person skilled in the art that various changes and modifications may be applied to the present invention without departing from the sprit or scope of the present invention.

This application is based on Japanese Patent Application 2012-045573, filed Mar. 1, 2012, the content of which is incorporated herein by reference.

Here, characteristics of the embodiments of the screw pair according to the above-described present invention and the co-rotating intermeshing type twin-screw extruder having the screw pair are simply collected together and listed as the following [1] to [6].

[1] A screw (14) pair comprising:
first and second screws (14a, 14b) for a co-rotating intermeshing type twin-screw extruder, the first and second screws having an outer circumferential surface (9) on which a groove (8) is spirally formed,
wherein the first and second screws (14a, 14b) are configured to rotate about an axis center of each screw (14a, 14b) in a state where the first and second screws (14a, 14b) mesh with each other and to transport a raw material in a predetermined direction (X1) along the axis center, and
wherein an inner surface of the groove of each of the first and second screws (14a, 14b) comprises:
   a first surface (8a), which faces in the predetermined direction (X1), and in which the outer circumferential surfaces (9) of the first and second screws (14a, 14b) are formed to coincide with each other without a gap therebetween in the state where the first and second screws (14a, 14b) mesh with each other; and
   a second surface (8b), which faces in a direction (X2) opposite to the predetermined direction (X1), and which forms a gap between the outer circumferential surfaces (9) of the first and second screws (14a, 14b) in the state where the first and second screws (14a, 14b) mesh with each other.

[2] The screw (14) pair according to the above [1], wherein the first surface (8a) of each of the first and second screws (14a, 14b) is curved to protrude in the predetermined direction (X1) from an opening side of a groove (8) of each of the first and second screws (14a, 14b) toward a bottom surface (8c) of the groove (8), and wherein the second surface (8b) of each of the first and second screws (14a, 14b) is formed to be parallel to a radial direction of each of the first and second screws (14a, 14b).

[3] The screw (14) pair according to the above [1], wherein the first surface (8a) and second surface (8b) of each of the first and second screws (14a, 14b) are curved to protrude in the predetermined direction (X1) from the opening side of a groove (8) of each of the first and second screws toward a bottom surface (8c) of the groove (8).

[4] The screw (14) pair according to any one of the above [1] to [3], wherein a value obtained by dividing a lead, which is the product of a pitch of the grooves adjacent in the predetermined direction and the number of threads of a flight, by a screw diameter is from 0.5 to 3.0.

[5] The screw (14) pair according to the above [1], wherein the first and second screws (14a, 14b) further comprise a throttling portion (15b), which is configured to remove a liquid component in the raw material, and which is provided at the predetermined direction (X1) side from a portion at which the groove (8) is formed.

[6] A co-rotating intermeshing type twin-screw extruder (12, 13) comprising the screw (14) pair according to any one of the above [1] to [5].

INDUSTRIAL APPLICABILITY

According to the present invention, it is possible to improve a draining capability of a screw without decreasing a transportation capability of the screw.

The present invention including the effects is effectively used in the art of a co-rotating intermeshing type twin-screw extruder.

REFERENCE SIGNS LIST

2: cylinder
3: die
4: raw material supply port
5: liquid discharge port
8: groove
8a: first surface
8b: second surface
8c: bottom surface
9: outer circumferential surface
11: vent
12: extruder having vent
13: extruder without vent
14, 16, and 17: screw
14a and 17a: first screw
14b and 17b: second screw
15a: transport portion
15b: throttling portion

The invention claimed is:

1. A screw pair comprising:

first and second screws for a co-rotating intermeshing type twin-screw extruder, the first and second screws having an outer circumferential surface on which a groove is spirally formed, wherein the first and second screws are configured to rotate about an axis center of each screw in a state where the first and second screws mesh with each other and to transport a thermoplastic synthetic resin raw material containing a liquid component in a predetermined direction along the axis center and to remove the liquid component from said raw material, and wherein an inner surface of the groove of each of the first and second screws comprises a first surface, which faces in the predetermined direction, and a second surface, which faces in a direction opposite to the predetermined direction, wherein the first surface of the first screw is formed such that the outer circumferential surface of the second screw coincides with the first surface of the first screw without a gap therebetween in the state where the first and second screws mesh together; and wherein the second surface of the first screw is formed such that a gap is formed between the second surface of the first screw and the outer circumferential surface of the second screw in the state where the first and second screws mesh together.

2. The screw pair according to claim 1, wherein the first surface of each of the first and second screws is curved to protrude in the predetermined direction from an opening side of a groove of each of the first and second screws toward a bottom surface of the groove, and wherein the second surface of each of the first and second screws is formed to be parallel to a radial direction of each of the first and second screws.

3. The screw pair according to claim 1, wherein the first surface and second surface of each of the first and second screws are curved to protrude in the predetermined direction from the opening side of a groove of each of the first and second screws toward a bottom surface of the groove.

4. The screw pair according to claim 1, wherein a value obtained by dividing a lead, which is the product of a pitch of the grooves adjacent in the predetermined direction and the number of threads of a flight, by a screw diameter is from 0.5 to 3.0.

5. The screw pair according to claim 1, wherein the first and second screws further comprise a throttling portion, which is configured to remove a liquid component in the raw material, and which is provided at the predetermined direction side from a portion at which the groove is formed.

6. A co-rotating intermeshing type twin-screw extruder comprising the screw pair according to claim 1.

7. A co-rotating intermeshing type twin-screw extruder comprising:

a cylinder;
a supply port;
a liquid discharge port;
first and second screws for a co-rotating intermeshing type twin-screw extruder, the first and second screws having an outer circumferential surface on which a groove is spirally formed;

wherein the first and second screws are configured to rotate about an axis center of each screw in a state where the first and second screws mesh with each other and to transport a thermoplastic synthetic resin raw material containing a liquid component in a predetermined direction along the axis center and to remove the liquid component from said raw material; and wherein an inner surface of the groove of each of the first and second screws comprises a first surface, which faces in the predetermined direction, and a second surface, which faces in a direction opposite to the predetermined direction;

wherein the first surface of the first screw is formed such that the outer circumferential surface of the second screw coincides with the first surface of the first screw without a gap therebetween in the state where the first and second screws mesh together; and wherein the second surface of the first screw is formed such that a gap is formed between the second surface of the first screw and the outer circumferential surface of the second screw in the state where the first and second screws mesh together.

8. The co-rotating intermeshing type twin-screw extruder according to claim 7, further comprising a vent located on the cylinder.

* * * * *